Sept. 20, 1949.  W. F. BERCK  2,482,645
ADJUSTMENT MECHANISM FOR FLUID METERS
Filed Dec. 4, 1946

INVENTOR.
WILLIAM F. BERCK
BY
Mellin & Hanscom
ATTORNEYS

Patented Sept. 20, 1949

2,482,645

UNITED STATES PATENT OFFICE 2,482,645

ADJUSTMENT MECHANISM FOR FLUID METERS

William F. Berck, Hayward, Calif., assignor to Ralph N. Brodie Company, Oakland, Calif., a corporation of California Application December 4, 1946, Serial No. 713,887

5 Claims. (Cl. 74—23)

1

The present invention relates to fluid meters of the displacement type and more particularly pertains to means for calibrating such meters.

The meter herein disclosed and to which my present invention is applicable is one in which a pair of cylinders is arranged in parallelism. Each cylinder contains a reciprocable and oscillatory piston and is provided with inlet and outlet ports arranged to be opened and closed by the piston operation in such a manner that the pressure of the inlet fluid actuates the pistons in the cylinders. The reciprocable strokes of the pistons operate a counting mechanism which translates the strokes into units of fluid measure. To make such translation accurate, it is necessary, of course, to reconcile the counter operation with the actual piston displacement per stroke.

It is the principal object of my present invention to provide an improved and simple adjustment mechanism for such meters by means of which the same may be accurately calibrated so that the counter operation will accurately correspond to the piston displacement.

One form which the invention may assume is exemplified in the following description and illustrated by way of example in the accompanying drawings, in which.

Figure 1:
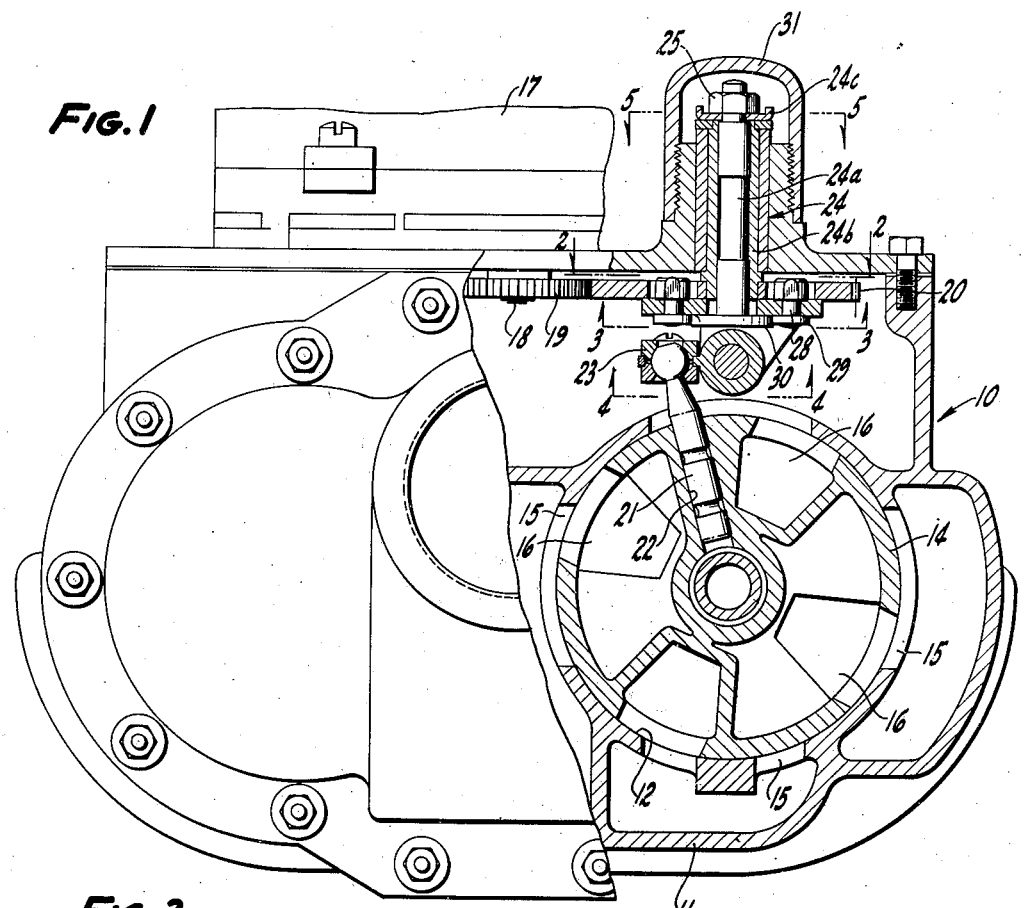
Fig. 1 is a view in end elevation, partly in transverse section, of a fluid meter embodying the preferred form of my invention.
Figure 2:
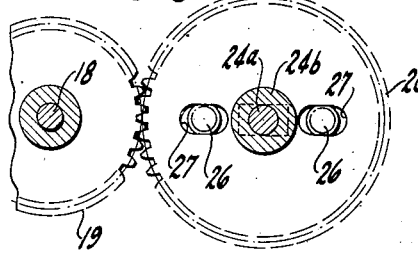
Fig. 2 is a fragmentary view in plan section taken on line 2—2 of Fig. 1.

Referring more particularly to the accompanying drawings, 10 indicates a liquid meter of the well-known displacement type having two reciprocable and oscillatory pistons which are actuated by the inlet pressure to effect metering. The meter 10 includes a meter casing or housing 11 formed with a pair of parallel metering cylinders 12. In each cylinder 12 is a reciprocable and oscillatory piston 14. The cylinders are each formed with inlet and outlet ports 15 which cooperate with piston ports 16 in the pistons 14 to enable the inlet fluid pressure to actuate the pistons 14 and thus effect metering. Meters such as described are old and well known and thus their construction and operation are not described in detail herein.

To register the metered amounts, a conventional counting mechanism 17 is employed and mounted on the meter casing 11. This meter counting mechanism is operated by the pistons 14 to register the amounts displaced thereby and indicate the same in volumetric units.

The counting mechanism 17 is driven by a counter drive-shaft 18 having a spur gear 19 fixed thereon. Each piston 14 is operatively associated with a gear 20 in mesh with the counter drive gear 19 so that the latter will be driven, as the piston reciprocates, in synchronism with the piston operation.

The operation of the piston and the counter is reconciled through the medium of the gear train just disclosed so that the displacement of the pistons will be accurately registered and indicated by the counting mechanism 17. It is essential, of course, that the reconciliation between the two operating elements be precise and accurate so that the counting mechanism 17 will accurately indicate and register the exact amount displaced by the pistons. Consequently, there must be provision made for accurate adjustment in small increments between the piston operation and the counting mechanism.

To drive the gear 20 from the piston 14, the latter is provided with a radially extending and reciprocable crank-pin 21 mounted in a radial socket 22 in the piston 14. The outer end of this pin 21 is connected with a crank member 23 relatively fixed to a crank-shaft 24 rotatably mounted on an axis which is perpendicular to the axis of the piston 14. In the present instance, I have shown the shaft 24 as mounted in the meter casing 11 overlying the piston 14 in a position where the axis of the crank-shaft 24 and the axis of the piston 14 intersect.

The crank-shaft 24 is rotatable in the meter housing in unison with the gear 20. That is to say, the crank-shaft 24 is in reality formed in two concentric parts, the center spindle 24a and an outer sleeve 24b. Keyed to the former is a pointer or indicator 24c and fixed thereon is an adjustment cam 30. The gear 20 is keyed to the outer sleeve 24b. In normal operation, the two parts 24a and 24b of the crank-shaft are firmly clamped together by means of a nut 25 so that they are relatively non-rotatable. However, by loosening the nut 25, the center spindle 24a may be turned by means of the pointer 24c relative to the outer sleeve 24b so as to effect angular adjustment of the cam 30 relative to the gear 20. This, as will be described, effects adjustment or varying of the stroke of the piston 14 by varying the amount of throw of the outer end of the crank-pin 21 relative to the center of rotation of the crank-shaft 24.

Figure 3:
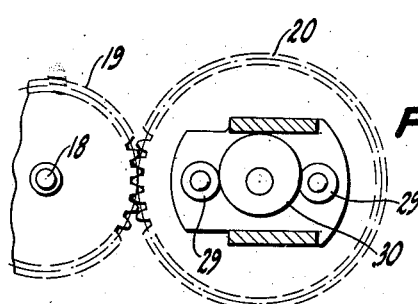
Fig. 3 is a fragmentary view in section taken on line 3—3 of Fig. 1.
Figure 4:
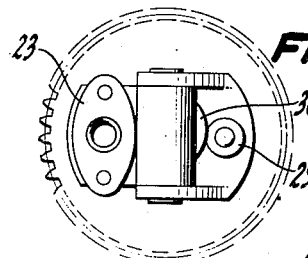
Fig. 4 is a fragmentary view in section taken on line 4—4 of Fig. 1.
Figure 5:
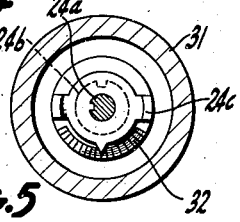
Fig. 5 is a fragmentary view taken on line 5—5 of Fig. 1.

The crank member 23 is most clearly illustrated in Figs. 1, 3 and 4 and is mounted on the gear 20 for adjustment diametrically thereof, so as to adjust the length of the stroke of the crank member 23 relative to the axial center of the shaft 24. Obviously, by moving the crank member 23 diametrically of the gear 20, the throw of the crank member 23 is varied, which changes the extent of oscillation of the piston 14 and thus changes the amount of displacement of the piston 14 on its reciprocable strokes. By this means, the displacement of the piston may be made to correspond precisely to the operation of the counting mechanism so that the latter will correctly indicate and register the amount displaced.

The mounting of the crank member 23 includes a pair of guide shoes 26 guided for diametrical movement on the gear 20 in slots 27 formed in the gear, which slots are engaged by the shoes 26 which are fixed to the crank member 23. The shoes 26 are mounted on studs 28 fixed in the crank member as illustrated. These studs likewise carry on the underside of the crank member 23 rollers 29 which engage the cam face of the cam 30 at diametrically opposite sides thereof. This cam 30, as previously described, is fixed to the center spindle 24a of the crank-shaft 24.

The adjustment cam 30 is of the constant motion type which is developed with sixteen positions representing fifteen increments of adjustment of ten degrees forty minutes each, which will result in a change of crank length of .006 inch per step, each increment of adjustment being exactly one-half of one per cent adjustment on the displacement of the meter. Thus, each piston of the meter is given an adjustment of seven and one-half per cent so that the total adjustment of the meter will be fifteen per cent.

Obviously, from the drawings, by adjusting the position of the cam circumferentially, by turning movement of the center spindle 24a, the distance between the axis of the crank-shaft 24 and the point of connection of the crank-pin 21 with the crank member 23 may be varied, thus adjusting the piston stroke to reconcile the displacement of the meter with the counting mechanism 17. By this means, of course, the meter can be accurately calibrated.

A removable cap 31 is provided over the exposed end of the crank-shaft and its associate mechanism for obvious reasons.

To adjust the meter, it is merely necessary to remove the cap 31, loosen the nut 25 and then turn the spindle 24a relative to the sleeve 24b the increment of adjustment desired, which will be indicated by the calibrated dial 32 which cooperates with the pointer 24c. When the cam is turned, as will be obvious from Fig. 3, the crank member 23 will be shifted diametrically of the gear 20 relative to the axis of the crank-shaft 24, thus varying its stroke as previously described. When the proper adjustment is obtained, the nut 25 is tightened so as to prevent relative rotation between the spindle 24a and the sleeve 24b.

From the foregoing it is obvious that I have provided a very simple but highly effective mechanism for accurately calibrating a fluid meter of the displacement type.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a device for translating reciprocating motion into rotary motion, comprising a cylinder, a piston reciprocable therein, a crank pin projecting from and reciprocable radially of said piston, a rotary member and a crank connected at one end to said crank pin and connected at its other end eccentrically to said rotary member, the improvement which comprises a ball and socket connection between said crank pin and crank and means hingedly connecting said crank and rotary member.

2. The device of claim 1, wherein said hinged connection comprises a sleeve formed on the crank and a shaft secured to said rotary member and carried rotatably within said sleeve.

3. In a fluid meter comprising a metering chamber, a piston reciprocable therein, a crank pin projecting from and reciprocable radially of said piston, a rotatable counter drive member and a crank connected at one end to said crank pin and connected at its other end eccentrically to said drive member, the improvement which comprises a ball and socket connection between said crank pin and crank and means hingedly connecting said crank and drive member.

4. The meter of claim 3, wherein said hinged connection comprises a sleeve formed on the crank and a shaft secured to said rotary member and carried rotatably within said sleeve.

5. The meter of claim 3, wherein said crank and drive member are connected by means guiding said crank for movement radially of said drive member, and including a radial cam and means engaging said cam and operable to move said crank radially of said drive member upon rotation of said cam, said cam having a plurality of rises of uniform increments of radius and arc.

WILLIAM F. BERCK.

REFERENCES CITED

The following references are of record in the file of this patent:

UNITED STATES PATENTS

| Number | Name | Date |
| --- | --- | --- |
| 544,380 | Roberts | Aug. 13, 1895 |
| 2,015,267 | Granberg | Sept. 24, 1935 |
| 2,094,445 | Burnett et al. | Sept. 28, 1937 |
| 2,395,715 | Berck | Feb. 26, 1946 |